(12) United States Patent
Schuerman

(10) Patent No.: US 8,793,033 B2
(45) Date of Patent: Jul. 29, 2014

(54) SATELLITE SIGNAL ACQUISITION APPARATUS, NAVIGATION APPARATUS AND METHOD OF ACQUIRING A SATELLITE SIGNAL

(75) Inventor: Kees Cornelis Pieter Schuerman, Veldhoven (NL)

(73) Assignee: TomTom International B.V., Amsterdam (NL)

( * ) Notice: Subject to any disclaimer, the term of this patent is extended or adjusted under 35 U.S.C. 154(b) by 70 days.

(21) Appl. No.: 13/394,595

(22) PCT Filed: Mar. 3, 2010

(86) PCT No.: PCT/EP2010/052684
§ 371 (c)(1),
(2), (4) Date: Jun. 22, 2012

(87) PCT Pub. No.: WO2011/026656
PCT Pub. Date: Mar. 10, 2011

(65) Prior Publication Data
US 2012/0259478 A1    Oct. 11, 2012

Related U.S. Application Data

(60) Provisional application No. 61/240,253, filed on Sep. 7, 2009.

(51) Int. Cl.
*G01S 19/07* (2010.01)
(52) U.S. Cl.
USPC ............................................ 701/1; 342/357.2

(58) Field of Classification Search
USPC .............................................. 701/1; 342/357.2
See application file for complete search history.

(56) References Cited

U.S. PATENT DOCUMENTS

| | | | |
|---|---|---|---|
| 5,796,365 A | * | 8/1998 | Lewis ..................... 342/357.25 |
| 2007/0290920 A1 | | 12/2007 | Shintai et al. |
| 2008/0234928 A1 | | 9/2008 | Matsuoka |
| 2008/0262728 A1 | * | 10/2008 | Lokshin et al. ............... 701/216 |

FOREIGN PATENT DOCUMENTS

| | | |
|---|---|---|
| EP | 1852711 A1 | 11/2007 |
| KR | 20050068971 A | 7/2005 |
| WO | 2008097389 A1 | 8/2008 |

OTHER PUBLICATIONS

International Search report issued Jun. 29, 2010 for International Application No. PCT/EP2010/052684.

* cited by examiner

*Primary Examiner* — Mary Cheung
*Assistant Examiner* — Yuen Wong

(57) ABSTRACT

A satellite signal acquisition apparatus comprises a parking detector (235) arranged to analyse, when in use, self-mobility behavior for monitoring mobility of a vehicle. The apparatus also comprises a global navigation satellite system receiver (238) operably coupled to the parking detector (235) and arranged to acquire a satellite signal using predicted satellite orbit data in response to the self-mobility behavior comprising the predetermined event sequence.

15 Claims, 8 Drawing Sheets

SATELLITE SIGNAL ACQUISITION APPARATUS, NAVIGATION APPARATUS AND METHOD OF ACQUIRING A SATELLITE SIGNAL

CROSS-REFERENCE TO RELATED APPLICATIONS

This application is the National Stage of International Application No. PCT/EP2010/052684, filed Mar 3, 2010 and designating the United States. The entire content of this application is incorporated herein by reference.

This application claims the benefit of priority from U.S. provisional application No. 61/240,253, filed Sep. 7, 2009. The entire content of this application is incorporated herein by reference.

FIELD OF THE INVENTION

The present invention relates to a location determination apparatus of the type that, for example, comprises a global navigation satellite system receiver for receiving a satellite signal. The present invention also relates to a navigation apparatus of the type that, for example, comprises a global navigation satellite system receiver for receiving a satellite signal. The present invention further relates to a method of determining a location, the method being of the type that, for example, comprises a global navigation satellite system that receives a satellite signal.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS receiver by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

As mentioned above, it is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 940 LIVE model manufactured and supplied by TomTom International B.V., provide a reliable means for enabling users to navigate from one position to another. Such devices are of great utility when the user is not familiar with the route to the destination to which they are navigating.

In relation to location determination, which can be used, but not essentially, when providing navigation assistance, the GPS receiver or other global navigation satellite system (GNSS) receiver relies upon satellite broadcast signals in order to be able to calculate a current location of the PND. However, when signal strength levels become insufficiently low, the GNSS receiver is unable to receive data error-free or at all. In this respect, it is known for received signal strength of the satellite broadcast signal to fall below an acceptable signal strength level when the PND enters a building, for example a parking garage, where the structure of the building impedes receipt by the GNSS receiver of the satellite broadcast signals.

As is known in the field of GNSSs, a satellite broadcast signal comprises, inter alia, almanac data and ephemeris data. The almanac data comprises data concerning orbits of a constellation of GNSS satellites and "health" of each satellite. The almanac data is approximate and is used, inter alia, by the GNSS receiver in order to identify satellites that are believed to be "visible" from a current position of the GNSS receiver. The almanac data is broadcast by each of the GNSS satellites and is used to speed acquisition of satellite broadcast signals, by discounting GNSS satellites that are clearly not visible to the GNSS receiver and so not worth seeking for receipt of respective satellite broadcast signals. The GNSS receiver is thus able to seek data signals from candidate satellites that are likely to be "visible". Once the GNSS receiver has locked on to the respective satellite broadcast signals from at least three, but optimally four, GNSS satellites, the GNSS receiver is able to obtain precise location data for the GNSS satellites using the respective ephemeris data broadcast by each GNSS satellite for which the GNSS receiver has locked on to a satellite broadcast signal.

In relation to acquisition of satellite broadcast signals, it is known for the GNSS receiver to implement a signal acquisition procedure having at least two stages. In a first stage, the receiver tries, initially, to use the almanac data previously obtained in order to identify candidate satellites from which to receive the satellite broadcast signals. Thereafter, if after trying to acquire the satellite broadcast signals of best candidate GNSS satellites using the almanac data, satellite broadcast signals cannot be acquired, the GNSS receiver initiates a "cold start" or "search the sky" procedure. This is the second stage of the signal acquisition procedure and comprises the GNSS receiver initiating a search through a series of Pseudo-Random Number (PN) codes, some of which identify GNSS satellites, in order to find any satellite broadcast signals from GNSS satellites that may be receivable. When the PND enters the parking garage, as mentioned above, the satellite broadcast signals are significantly attenuated and so not usually receivable from within the parking garage. Assuming that the PND is located within a vehicle, the vehicle is typically then parked and powered down. Consequently, where the GNSS receiver is powered-up again, the GNSS receiver initiates a search for "visible" satellites using the almanac data, but finds that no GNSS satellites are "visible". In accordance with the signal acquisition procedure, the GNSS receiver ignores or even discards the almanac data and initiates the cold start procedure. However, when the PND exits the parking garage, the performance of the cold start procedure is time consuming and leads to a delay in the PND calculating a fix on the current location of the PND. Therefore, the location-based features of the PND are not of use until the GNSS receiver has locked onto satellite broadcast signals from at least three GNSS satellites. This can be inconvenient to the user.

SUMMARY OF THE INVENTION

According to a first aspect of the present invention, there is provided a satellite signal acquisition apparatus comprising: a parking detector arranged to analyse, when in use, self-mobility behaviour for monitoring mobility of a vehicle; and a global navigation satellite system receiver operably coupled to the parking detector and arranged to acquire a satellite signal using predicted satellite orbit data in response to the self-mobility behaviour comprising the predetermined event sequence.

The global navigation satellite system receiver may be arranged to suspend execution of a satellite signal acquisition procedure in response to the self-mobility behaviour comprising a predetermined event sequence.

The global navigation satellite system receiver may be arranged to use the predicted satellite orbit data to acquire the satellite signal following an immediately preceding failed attempt within a preceding predetermined period of time to acquire the satellite signal using the predicted satellite orbit data.

The predicted satellite orbit data may be approximate.

The predicted satellite orbit data may be almanac data.

The parking detector may be arranged to detect first mobility behaviour associated with parking in a building, and to detect second mobility behaviour associated with exiting the building subsequent to the first mobility behaviour.

The first mobility behaviour followed by the second mobility behaviour may constitute the predetermined event sequence.

Detection of the first mobility behaviour may comprise detecting a first predetermined event followed by a second predetermined event.

The detection of first mobility behaviour may comprise detecting the first predetermined event and a first predetermined corroborating event.

The first predetermined event corresponds to entering a building.

The first predetermined event may be a transition of a signal strength of a satellite broadcast signal by an amount equal to or greater than a predetermined signal strength change value.

The apparatus may further comprise: a bi-directional communications module arranged to receive, when in use, a communications signal; wherein the first predetermined corroborating event may comprise a reduction of a signal strength of the communications signal by an amount equal to or greater than a predetermined communications signal strength change value.

The apparatus may further comprise: a light level measurement unit arranged to measure an ambient light level; wherein the first predetermined corroborating event may comprise a change in the ambient light level by an amount equal to or greater than a predetermined light level change value.

The apparatus may further comprise: a speed calculator arranged to measure a speed; wherein the first predetermined corroborating event may comprise a reduction in the speed to or below a first predetermined speed.

The first predetermined corroborating event may comprise a subsequent increase in the speed to or below a second predetermined speed; the second predetermined speed may be greater than the first predetermined speed.

The second predetermined event may correspond to parking for a vehicle.

The second predetermined event may be the signal strength of the satellite broadcast signal being at or below a predetermined unacceptable signal strength level when departure from a parking space is detected.

The satellite broadcast signal may remain at or below the predetermined unacceptable signal strength level between when a travel speed is substantially at stationary and when departure from the parking space is detected.

An act of powering up may constitute the departure from the parking space and/or movement after a predetermined period of time may constitute departure from the parking space.

The navigation apparatus may be powered down between the first time and the second time.

Detection of the first mobility behaviour may comprise detecting the second predetermined event and a second predetermined corroborating event.

The second predetermined corroborating event may comprise a travel speed reducing to stationary within a predetermined period of time from detection of the first predetermined event.

The second predetermined corroborating event may comprise a last known position being within a predetermined distance of a last known destination used.

The second predetermined corroborating event may comprise a last known location being within a predetermined distance of a parking garage.

The parking detector may be arranged to search a point of interest database in order to identify the parking garage.

The second predetermined corroborating event may comprise a last known location being within a predetermined distance of a last known navigation destination used and the last known navigation destination used may correspond to a public parking building.

An identity of the parking garage may be obtained from a point of interest database accessible by the parking detector.

Detection of the second mobility behaviour associated with exiting the building may comprise detection of a third predetermined event; the third predetermined event may be a transition of a signal strength of a satellite broadcast signal from an unacceptable signal strength level to an acceptable signal strength level.

Detection of the second mobility behaviour may comprise detecting the third predetermined event and a third predetermined corroborating event.

The apparatus may further comprise: a bi-directional communications module arranged to receive, when in use, a telecommunications signal; wherein the third predetermined corroborating event may comprise an increase in a signal strength of the communications signal to or above a predetermined acceptable communications signal strength level.

The apparatus may further comprise: a light level measurement unit arranged to measure an ambient light level; wherein the third predetermined corroborating event may comprise a change in the ambient light level by at least a predetermined light level change value.

The apparatus may further comprise: a speed calculator arranged to measure a speed; wherein the third predetermined corroborating event may comprise a decrease in the speed to or below a second predetermined speed. The third predetermined corroborating event may comprise a last known position being within a building.

The building may be a parking garage. The building may feature in a points of interest database accessible by the parking detector.

According to a second aspect of the present invention, there is provided a navigation apparatus comprising the satellite signal acquisition apparatus as set forth above in relation to the first aspect of the invention.

The parking detector may be arranged to initiate a user confirmation request via a user interface in relation to a current location being within a parking garage; a response provided to the confirmation request via the user interface confirming the current location being within the parking garage may constitute the second predetermined corroborating event.

The apparatus may further comprise a route calculator arranged to calculate a route from a current location to a destination location; the route calculator may be further arranged to include in-park guidance from the current location to a start location for navigation.

The navigation apparatus may be a portable navigation device.

According to a third aspect of the present invention, there is provided a method of acquiring a satellite signal, the method comprising: analysing self-mobility behaviour of a navigation apparatus for monitoring mobility of a vehicle; and a global navigation satellite system receiver acquiring a satellite signal using predicted satellite orbit data in response to the self-mobility behaviour comprising a predetermined event sequence.

According to a fourth aspect of the present invention, there is provided a computer program element comprising computer program code means to make a computer execute the method as set forth above in relation to the third aspect of the invention.

The computer program element may be embodied on a computer readable medium.

It is thus possible to provide an apparatus and method in relation to determining a location that has an improved so-called Time To First Fix (TTFF) following exit from a building, for example a parking garage. As the TTFF is improved, user experience in relation to use of the navigation apparatus is therefore improved, because the start-up time for providing navigation and other location-based functionality is reduced. The user therefore does not have to guess at initial part of a route and hence risk starting along a route that, ultimately, results in a longer journey time and/or a detour in order to follow an optimum route that would eventually be calculated by the navigation apparatus where the TTFF is slow. The ability to minimise delay also reduces inconvenience to the user and reduces driver workload and hence also improves safe use of the apparatus.

Other advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
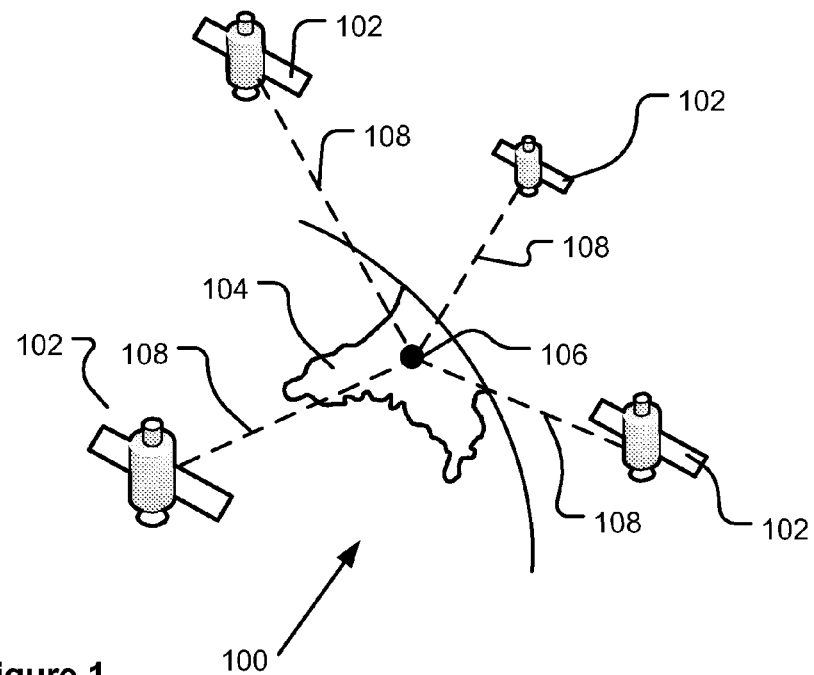
FIG. 1 is a schematic illustration of an exemplary part of a Global Positioning System (GPS) usable by a navigation apparatus.

Throughout the following description identical reference numerals will be used to identify like parts.

One or more embodiments of the present invention will now be described with particular reference to a PND. It should be remembered, however, that the teachings herein are not limited to PNDs but are instead universally applicable to any type of electronic processing device capable of determining a location thereof, for example but not essentially those configured to execute navigation software in a portable and/or mobile manner so as to provide route planning and navigation functionality. It follows therefore that in the context of the embodiments set forth herein, an electronic apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing, for example, route planning and navigation software. Indeed, a mobile telephone, smartphone, a music player, such as an MP3 player, or the like can simply be employed in respect of some embodiments without the benefit of route planning or navigation software.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be, determined with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. As mentioned above, the GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position. Further details concerning acquisition of satellite broadcast signals will be described later herein.

Figure 2:
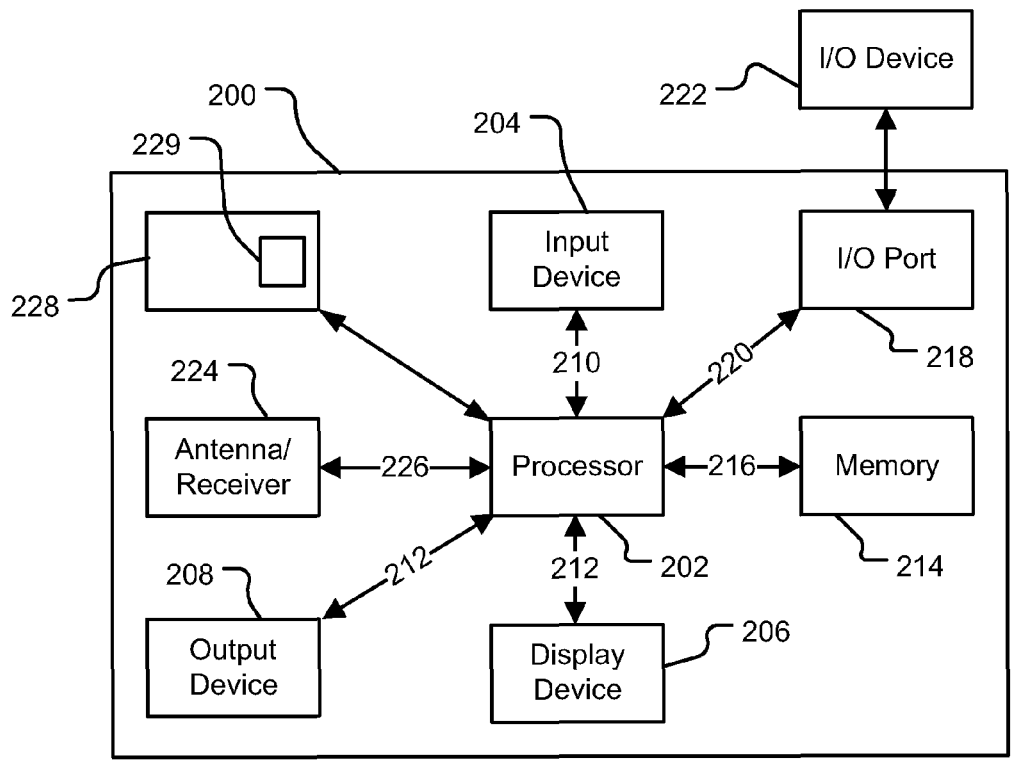
FIG. 2 is a schematic diagram of electronic components of a navigation apparatus.

Referring to FIG. 2, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource, for example a processor 202, the processor 202 being coupled to an input device 204 and a display device, for example a display screen 206. The processing resource and the communications interface (mentioned above) constitute parts of an alert content reception apparatus. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

Figure 5:
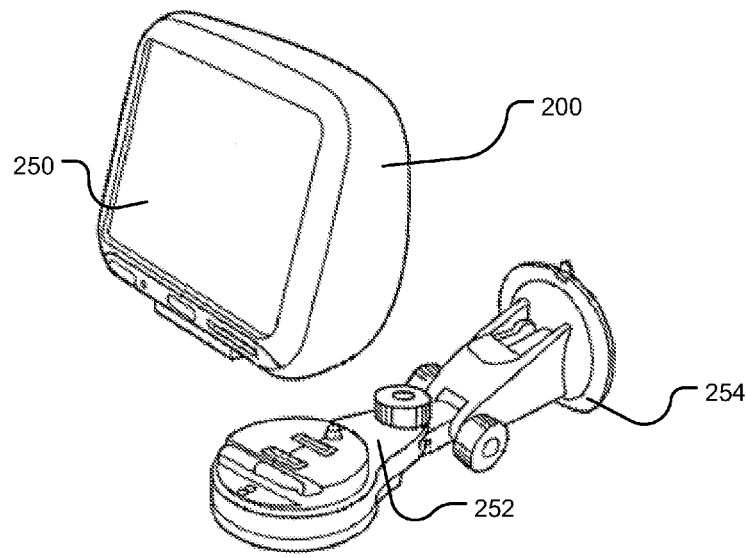
FIG. 5 is a schematic diagram of a docking arrangement for optional use in a vehicle.

In one arrangement, one aspect of the input device 204, the touch panel, and the display screen 206 are integrated so as to provide an integrated input and display device, including a touchpad or touchscreen input 250 (FIG. 5) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from the input device 204 via a connection 210, and operatively connected to at least one of the display screen 206 and an output device 208, via respective output connections 212, to output information thereto. The output device 208 is, for example, an audible output device (e.g. including a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices. The processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation apparatus 200. The memory resource 214 comprises, for example, a volatile memory, such as a Random Access Memory (RAM) and a non-volatile memory, for example a digital memory, such as a flash memory. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones.

FIG. 2 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

Figure 3:
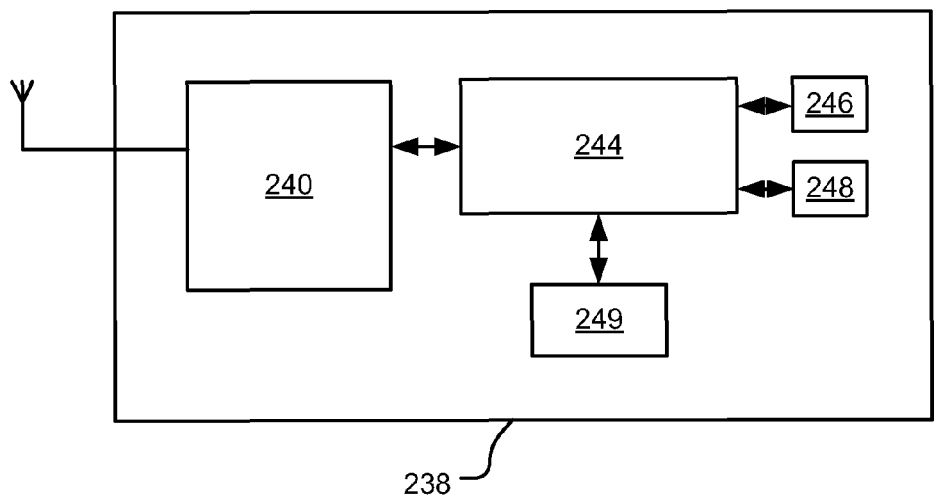
FIG. 3 is a schematic diagram of a GPS receiver constituting an embodiment of the invention.

Turning to FIG. 3, in order to support an improved Time To First Fix (TTFF), the GPS antenna/receiver 224 comprises a GPS antenna 236 operably coupled to a GPS receiver 238, the GPS receiver 238 comprising a Radio Frequency (RF) processing block 240 operably coupled to the GPS antenna 236 for receiving satellite broadcast signals, for example GPS RF signals, via the GPS antenna 236 for conversion to digital data. The RF processing block 240 is operably coupled to another processing resource 244, for example a microprocessor for processing the digital data provided by the RF processing block 240 in order to provide location data, for example a location fix. The another processing resource 244 is operably coupled to a non-volatile memory, for example a Read Only Memory (ROM) 246, and a volatile memory, for example another RAM 248. The processing resource 244 is also operably coupled to a Universal Asynchronous Receiver/Transmitter (UART) 249 for communication of the location data to the processing resource 202. As the respective details of the RF processing block 240 and the UART 249 are not relevant to the operation of the embodiments herein, the RF processing block 240 and the UART 249 will not be described in further detail in order not to distract from the salient aspects of the embodiments.

Referring back to FIG. 2, in order to support communications in a communications network, for example a Global System for Mobile communications (GSM) network, the processor 202 is also coupled to a cellular communications module 228 constituting the mobile telephone technology mentioned above. The cellular communications module 228 supports the communications interface 229. The cellular communications module 228 also supports a bidirectional data communications service, for example a packet switched data service, such as a General Packet Radio Service (GPRS) supported by the GSM communications network. The communications interface 229 is therefore compatible with the bidirectional data communications service.

The cellular communications module 228 also includes an insertable card, for example a Subscriber Identity Module (SIM) card (not shown). Whilst, in this example, the mobile telephone technology is compatible with a GSM communications network, the skilled person should appreciate that the cellular communications module 228 can, in fact, be any suitable communications module other than the GPS antenna/receiver 224, for example a bi-directional communications module, such as a communications module compatible with a subscription-based wireless communications network, for example a Universal Mobile Telecommunications System (UMTS) network or a CDMA2000 network.

Although not shown in FIG. 2, the navigation apparatus 200 also comprises a light level measurement unit arranged to measure an ambient light level relative to the location of the navigation apparatus 200. The navigation apparatus 200 also comprises motion sensors, for example accelerometers, that are used by any suitable speed calculator (also not shown) to measure speed, for example travel speed, of the navigation apparatus 200. Of course, for implementations where the navigation apparatus 200 has access to an in-vehicle data system, for example via an in-vehicle communications network, such as a Controller Area Network (CAN) or a Flexray™ network, the speed of the vehicle can be obtained via the data provision infrastructure of the vehicle.

It will, of course, be understood by one of ordinary skill in the art that the electronic components shown in FIG. 2 are powered by one or more power sources (not shown) in a conventional manner. As will be understood by one of ordinary skill in the art, different configurations of the components shown in FIG. 2 are contemplated. For example, the components shown in FIG. 2 may be in communication with one another via wired and/or wireless connections and the like. Thus, the navigation apparatus 200 described herein can be a portable or handheld navigation apparatus.

Figure 4:
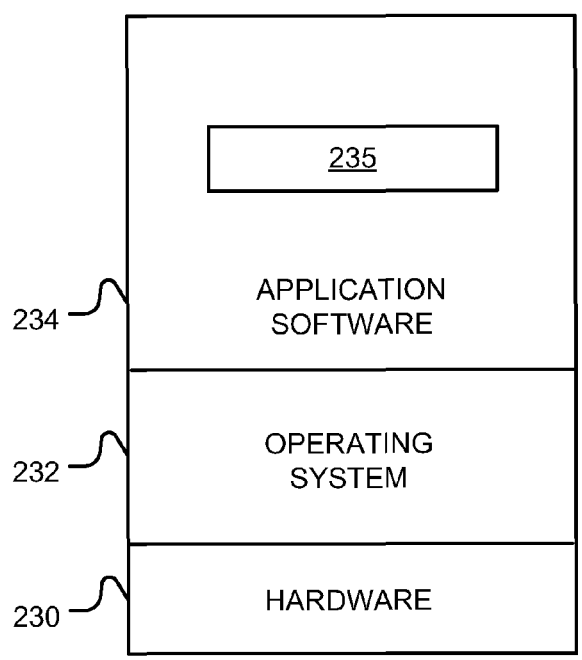
FIG. 4 is a schematic representation of an architectural stack employed by the navigation apparatus of FIG. 2.

Turning to FIG. 4, the memory resource 214 of the navigation apparatus 200 stores a boot loader program (not shown) that is executed by the processor 202 in order to load an operating system 232 from the memory resource 214 for execution by functional hardware components 230, which provides an environment in which application software 234 can run. The operating system 232 serves to control the functional hardware components 230 and resides between the application software 234 and the functional hardware components 230. The application software 234 provides an operational environment including the GUI that supports core functions of the navigation apparatus 200, for example map viewing, route planning, navigation functions and any other functions associated therewith. In this example, the application software 234 supports a parking detector module 235 for controlling a signal acquisition procedure of the GPS receiver 238. In this regard, communication with the GPS receiver 238 is achieved via the UART 249.

To facilitate use thereof, the portable or handheld navigation apparatus 200 of FIG. 2 can be connected or "docked" in a known manner in an automobile, or any other suitable vehicle, for example to a bicycle, a motorbike or a boat. The navigation apparatus 200 is then removable from the docked location for portable or handheld navigation use. In this respect (FIG. 5), the navigation apparatus 200 may be a unit that includes the integrated input and display device 250 and the other components of FIG. 2 (including, but not limited to, the internal GPS antenna/receiver 224, the microprocessor 202, a power supply (not shown), memory resource 214, etc.).

The navigation apparatus 200 may sit on an arm 252, which itself may be secured to a vehicle dashboard/window/etc. using a suction cup 254. This arm 252 is one example of a docking station to which the navigation apparatus 200 can be docked. The navigation apparatus 200 can be docked or otherwise connected to the arm 252 of the docking station by snap connecting the navigation apparatus 200 to the arm 252 for example. The navigation apparatus 200 may then be rotatable on the arm 252. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

In operation, it is assumed, for the sake of conciseness of description, that the user, a visitor to London Zoo in the UK is located at the Outer Circle (a road) around Regents Park where London Zoo is located, and requires navigation assistance to a parking garage in Park Lane, London in order to visit a cinema nearby.

In order to implement navigation to the above destination using the navigation apparatus 200, the user configures a route for calculation as follows. Referring to FIGS. 6 to 10, the user undertakes an illustrative destination location input process described hereinbelow using the user interface. Although not shown, the user uses a settings menu option supported by the application software 234 in order to select view generation in a three-dimensional mode.

Figure 6:
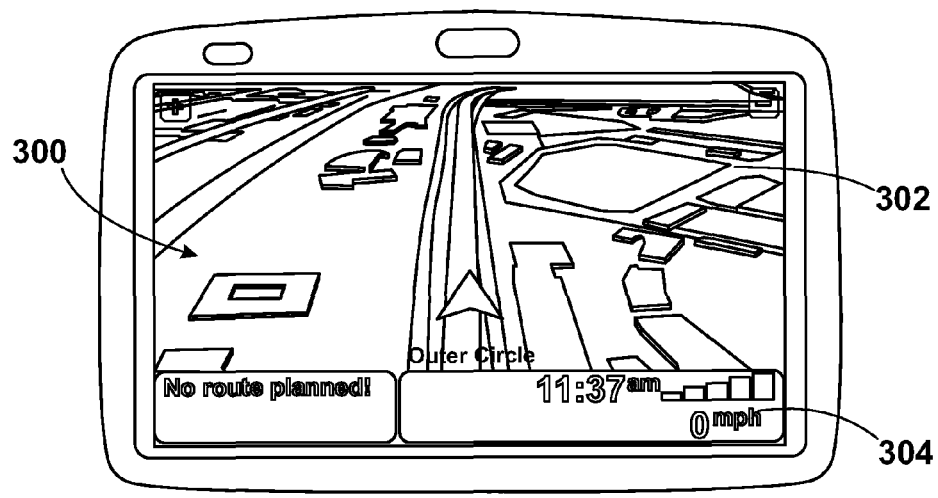
FIGS. 6 to 11 are screen shots of the navigation apparatus in relation to selection of a route associated with a proposed journey.

When the user powers-up the navigation apparatus 200, GPS receiver 238 of the apparatus 200 acquires GPS data and performs a self-location determination by calculating (in a known manner) the current location of the navigation apparatus 200, the location fix data being passed to the processor 202 for use by the application software 234. The user is therefore then presented, as shown in FIG. 6, with a display 300 showing in pseudo three-dimensions: a local environment 302 in which the navigation apparatus 200 is determined to be located and, in a region 304 of the display 300 below the local environment 302, a set of control and status messages.

Figure 7:
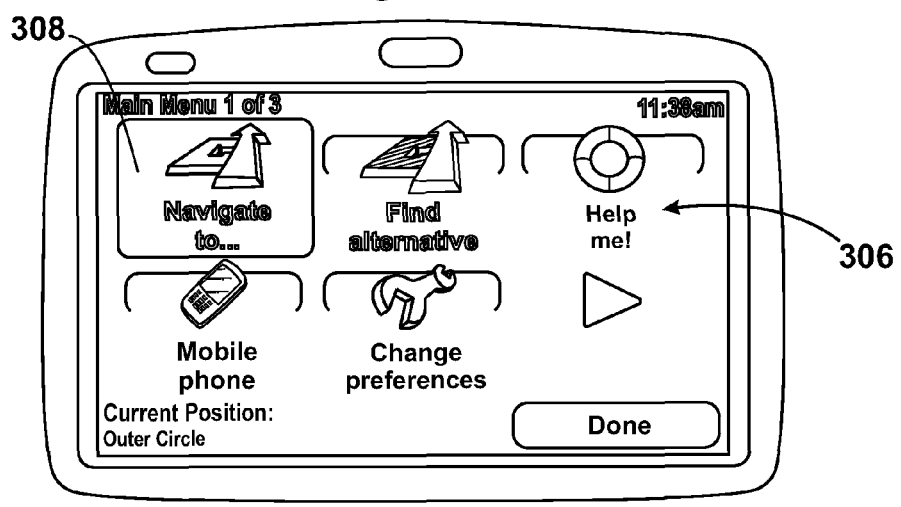

By touching the display at the local environment 302, the navigation apparatus 200, through the user interface, updates the display 300 by displaying (as shown in FIG. 7) a series of virtual or soft buttons 306 by means of which the user can, inter alia, input a destination to which the user wishes to navigate.

Figure 8:
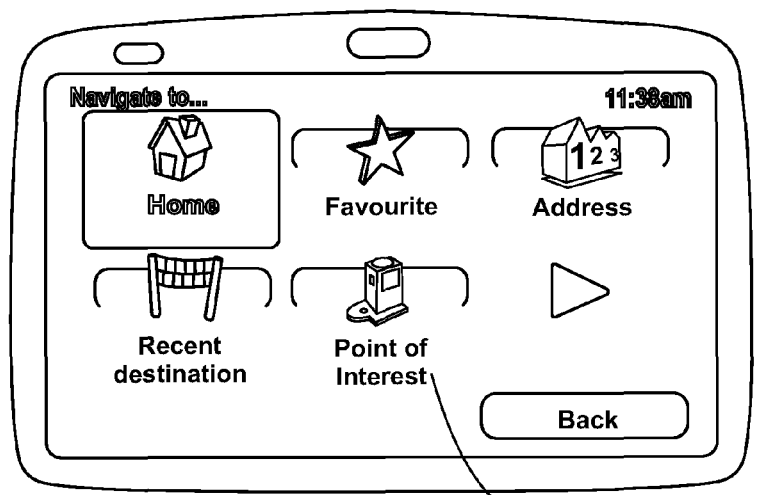

By touching the "Navigate to" virtual button 308, the navigation apparatus 200 initiates a route calculation procedure, a part of which comprises a route creation procedure. In accordance with the route creation procedure, the navigation apparatus 200 displays (as shown in FIG. 8) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation apparatus 200 and if one of these destinations is then selected the destination for the route to be calculated is set to the selected previously stored destination. An "Address" virtual button, if pressed, commences a process by which the user can input the street address of the destination to which the user wishes to navigate. The "recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button 310, if pressed, reveals a number of options by means of which a user can opt to navigate to any of a plurality of locations, such as Automatic Teller Machines (ATMs), petrol stations, a parking garage or tourist attractions for example, that have been pre-stored in the navigation apparatus 200 in a Points of Interest (POI) database (not shown) stored by the memory resource 214 as locations to which a user of the navigation apparatus 200 might want to navigate to. A triangular arrow-like virtual button provides access to additional sub-menu options relating to the "Navigate to . . . " menu option.

Figure 9:
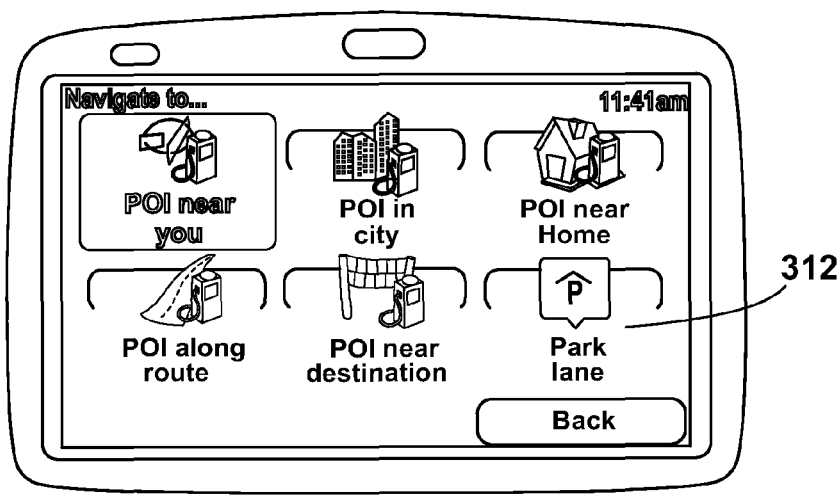

Since the user, in this example, wishes to find a parking garage in Park Lane, London, the user operates the "Point of Interest" virtual button 310 (by touching the button displayed on the touchscreen) in order to select the parking garage by accessing the database stored by the navigation apparatus 200, whereupon (as shown in FIG. 9) the user is presented with a series of point of interest input options: point of interest selection by "POI near you", by "POI in city", by "POI near Home", by "POI along route" (currently not selectable), by "POI near destination" (also currently not selectable) and by a previously selected POI indicated by the "Park lane" virtual button 312. The "Park lane" virtual button 312 is displayed because the user has, in the example, recently selected the Park Lane parking garage on a previous occasion as a POI for navigation assistance purposes.

In this example, the user wishes to navigate to the Park Lane parking garage and so the user operates the "Park lane" virtual button 312 (by touching the button displayed on the touchscreen) in order to select the Park Lane parking garage as a destination location.

Figure 10:
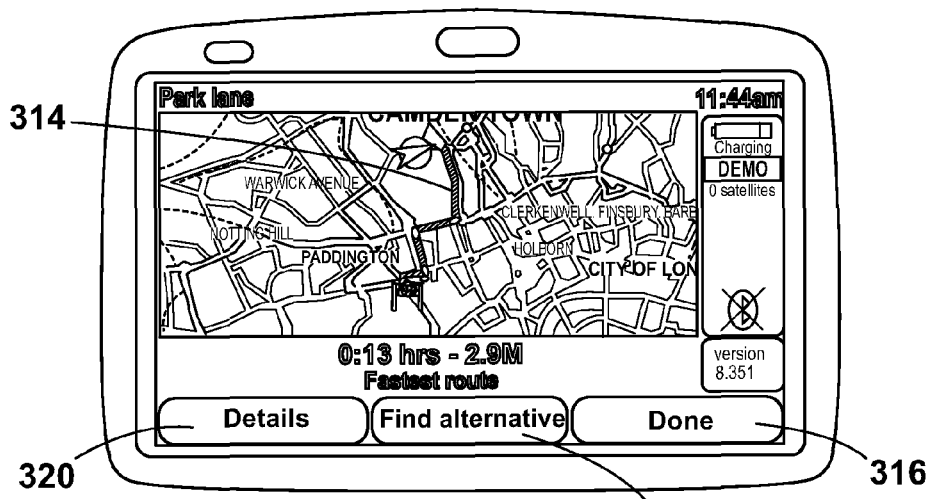

Once the Park Lane parking garage has been selected, the navigation apparatus 200 then calculates a route between the current location and the selected destination, and displays a route 314 calculated, as shown in FIG. 10, on a relatively low magnification map that shows the entire route. The user is also provided with a "done" virtual button 316 which the user can press to indicate the calculated route is acceptable, a "find alternative" virtual button 318 that the user can press to cause the navigation apparatus 200 to calculate another route to the selected destination, and a "details" virtual button 320 that a user can press to reveal selectable options for the display of more detailed information concerning the currently displayed route 314.

In this instance, it is assumed that the user considers the displayed route acceptable, and once the "done" button 316 has been pressed the user is presented, with a three-dimensional view (not shown) of the current, start, location for the navigation apparatus 200.

Figure 11:
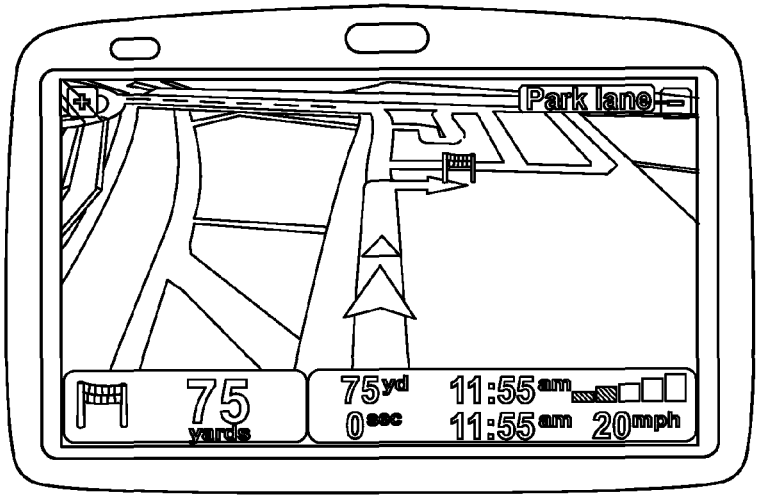

The user then commences their journey and the navigation apparatus 200 guides the user. The navigation apparatus 200 periodically acquires GPS data and performs a self-location determination by calculating (in a known manner) the current location of the navigation apparatus 200. Using the current location information calculated, the navigation apparatus 200, in a known manner, updates the map in accordance with determined changes in location of the navigation apparatus 200, and guides the user by providing visual and, optionally, audible navigation instructions until the destination selected is approaching or reached (FIG. 11).

In order to ensure that a location fix is provided by the GPS receiver 238 in an optimum time, the parking detector 235 monitors or analyses self-mobility behaviour of the navigation apparatus 200, which corresponds in this example to the mobility of the vehicle in which the navigation apparatus 200 is located. In this example, the self-mobility behaviour comprises a predetermined event sequence, the predetermined event sequence being characterised by a first mobility behaviour and a second mobility behaviour. The first mobility behaviour comprises a first predetermined event, and can comprise a first corroborating event. The first mobility behaviour also comprises a second predetermined event and can comprise a second corroborating event. The second mobility behaviour comprises a third predetermined event and can comprise a third corroborating event.

The first mobility behaviour, when detected, is indicative of the vehicle entering a building, for example the parking garage and being parked, whereas the second mobility behaviour, when detected, is indicative of the vehicle exiting the parking garage. The detection of the first and second mobility behaviours will now be described.

Figure 12:
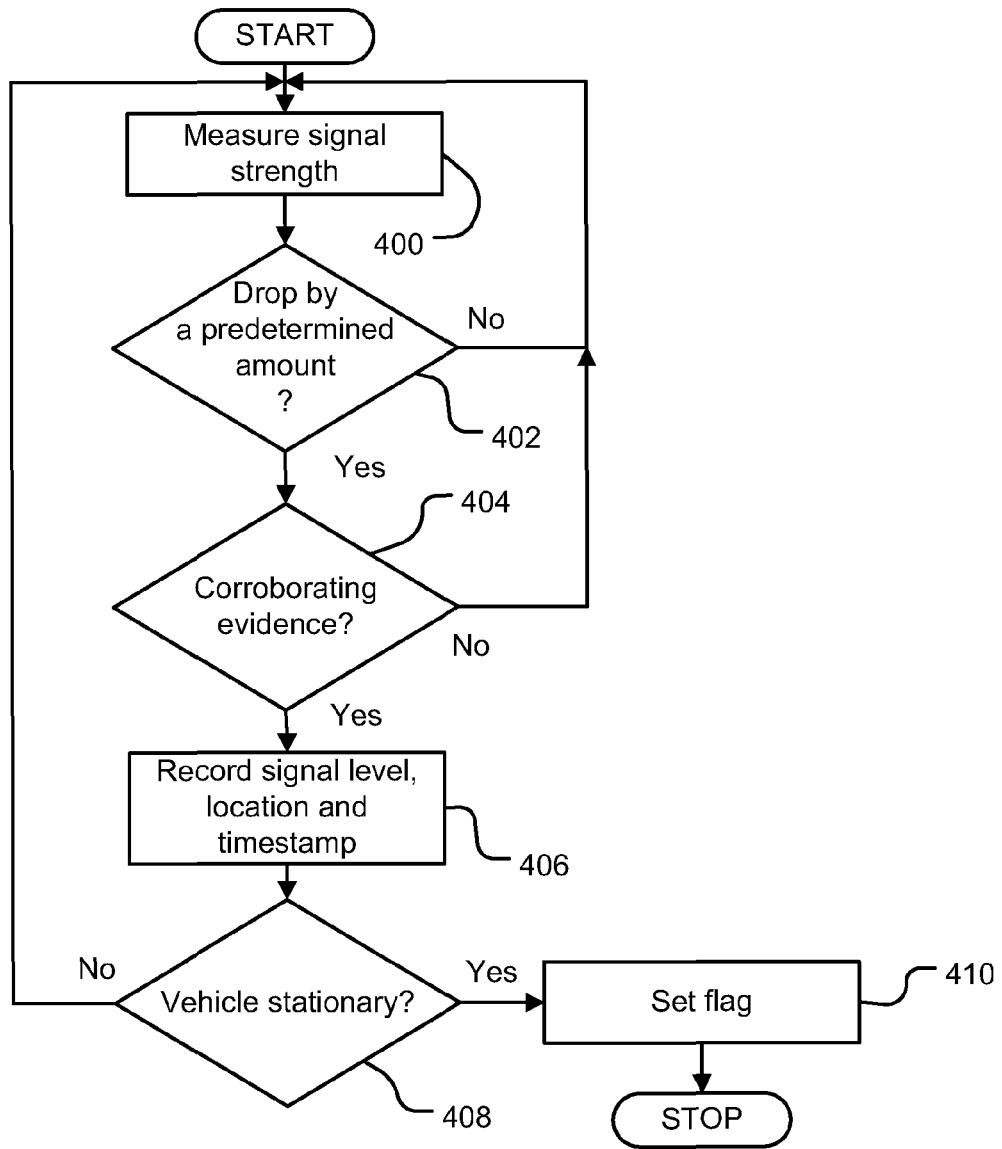

Referring to FIG. 12, during the journey to the destination, in this example, the Park Lane parking garage, the GPS receiver 238 measures (Step 400) signal strength levels of the satellite broadcast signals receivable by the GPS receiver 238 and, in this example, being used for location determination.

The parking detector 235 accesses the signal strength measurements provided by the GPS receiver 238 and, in this example, selects for monitoring a satellite broadcast signal having a strongest measured signal strength and, in this example, being used for location determination. In this respect, the parking detector 235 analyses the measured strongest signal in order to determine (Step 402) a drop or decrease in the measured signal strength of the selected satellite broadcast signal that is equal to or greater than a predetermined satellite signal strength change value, for example up to about 25 dBm, such as up to about 10 dBm, corresponding to an inability to receive error-free location-related data; this transition constitutes the first predetermined event of the first mobility behaviour. The reduction in the signal strength measured can be assessed in relation to a change within a predetermined period of time. The parking detector 235 then seeks to identify first corroborating evidence (Step 404). The first corroborating evidence is determined by identifying the first corroborating event, for example the signal strength of a telecommunications signal received by the communications module 228 falling or reducing by a predetermined communications signal strength change value or more within the predetermined period of time, for example 30 seconds. Of course, the skilled person should appreciate that a signal strength associated with another type of suitable bi-directional communications system can be used.

Another possible additional or alternative first corroborating event is an ambient light level change. In this regard, the light level measurement unit of the navigation apparatus 200 can measure the ambient light level and the parking detector 235 can acquire the measured light level information and determine whether the measured light level has changed by a predetermined light level change value or more, for example within the relatively short period of time, for example 30 seconds. Depending upon the time, the change in light level to be detected can be an increase or decrease in light level, for example at night, the change is an increase in light level, because the parking garage is well lit, whereas during the day the change is likely to be a decrease in the light level. Additionally, or alternatively, the first corroborating event can be detection of a change in speed using the speed calculator mentioned above. In this respect, the navigation apparatus 200 is capable of determining a current speed, which corresponds to the current speed of the vehicle in which the navigation apparatus 200 is located. The parking detector 235 is able to acquire the current calculated speed and determine if the current speed has fallen to or below a first predetermined speed, for example less than 10 kph. The parking detector 235 can also assess the drop in speed with reference to an upper threshold value, for example a drop from a speed at or above an upper threshold value, for example 35 kph, to a speed at or below the first predetermined speed. Furthermore, the parking detector 235 can also be arranged to detect a subsequent increase in speed to or below a second predetermined speed that is greater than the first predetermined speed, which can be a characteristic of a speed vs. time profile when a vehicle enters a parking garage.

If the first corroborating event is also detected by the parking detector 235, the detection of the first predetermined event and the first corroborating event constitutes evidence of the navigation apparatus 200 having entered the parking garage, because RF signal strengths penetrate the structure of the parking garage with difficulty and so a signal strength drop results. Also, the change in ambient light level and/or travel speed are consistently indicative of the act of entering the parking garage.

Consequently, upon detection of the first predetermined event and the first corroborating event, the parking detector 235 records (Step 406) the satellite broadcast signal strengths of the GPS satellites that were being used to provide a position fix and the signal strength of the telecommunications signal being or that was being received by the communications module 228 along with timestamp data for the time the transitions were detected.

The parking detector 235 further analyses the speed of the navigation device 200 in order to determine (Step 408) whether the navigation apparatus 200 has come to rest, i.e. is stationary. The lack of mobility of the navigation apparatus 200 following the first predetermined event is indicative of the vehicle being parked and will be used later herein by the parking detector 235. In the event that the navigation apparatus 200 is determined to be at rest within a predetermined period of time, for example 2 minutes, the parking detector 235 sets (Step 410) a parked flag. Otherwise, the parking detector 235 continues to monitor the signal strength of the satellite broadcast signals and any other corroborating evidence. The coming to rest of the navigation apparatus 200 within the predetermined period of time is an example of the second predetermined event and will be used by the parking detector 235 as described later herein.

Figure 13:
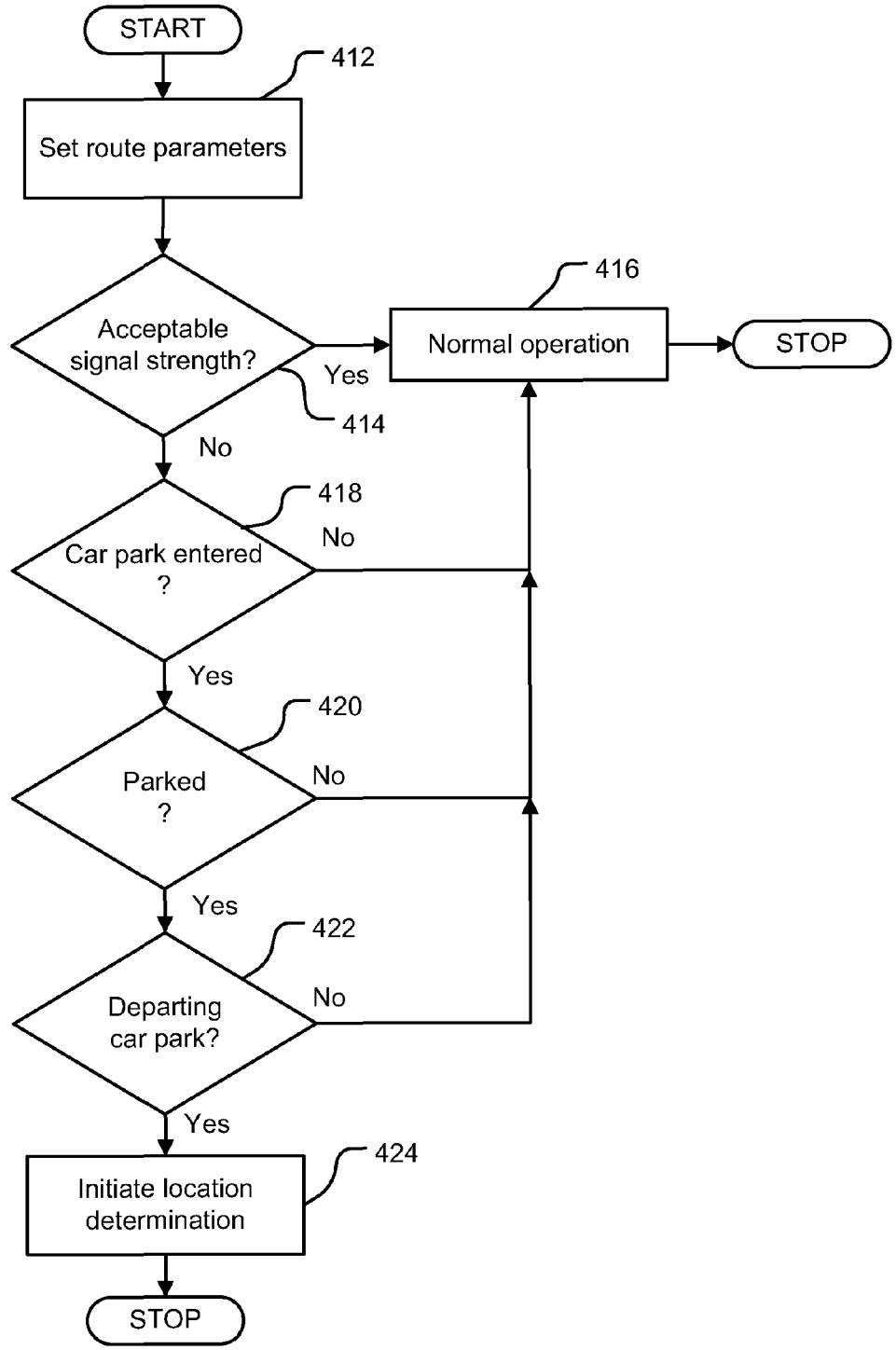

Assuming the vehicle has been parked in a parking space or bay, after parking, the vehicle is typically powered down, although the vehicle can be left in a powered-up condition. When the user wishes to move from the parking space after a predetermined period of parking time, the navigation apparatus 200 is powered up, if in a powered-down condition, for example when the user returns to the vehicle and wishes to drive to a new destination. Turning to FIG. 13, the user then, in this example, sets (Step 412) route parameters in a like manner to that described above in order to obtain navigation assistance to the new destination from the navigation apparatus 200. However, it should be appreciated that it is not essential to use the navigation-related functionality of the navigation apparatus 200 need not be used following return to the vehicle by the user.

Once powered-up or if not powered-down temporarily, the GPS receiver 238 analyses the signal strengths associated with the GPS satellites previously used to provide a location fix. If sufficient signal strength is available, then GPS receiver 238 is able to receive location-related data and location determination can take place, constituting "normal" operation. However, in this example, having lost lock on the satellite broadcast signals previously being used, the GPS receiver 238 by default tries to use the almanac data to acquire broadcast signals. However, as the navigation apparatus 200 is still located within the parking garage, use of the almanac data does not lead to successful acquisition of any satellite broadcast signals. The GPS receiver 238 therefore defaults to executing a "search the sky" or "cold start" search of satellite broadcast signals by cycling through all the PN codes in order to find at least three satellites from which location-related data can be received error-free. As insufficient signal strength exists, the GPS receiver 238 simply continues the cold start search until a time is reached when satellite broadcast signals can be received with sufficient signal strength or instructed otherwise by the parking detector 235.

In this example, at this stage, the GPS receiver 238 disregards but does not discard the almanac data. However, once the vehicle has begun to move from the state of rest and/or the next route has been calculated, the parking detector 235 analyses (Step 414) the signal strengths associated with the GPS satellites previously used to provide the location fix. Of course, if the signal strengths were sufficiently high for error-free location-related data to be received, the GPS receiver 238 would acquire satellite signals using the almanac data stored and, the navigation apparatus 200 would continue the normal operation (Step 416) mentioned above, including provision of any location determination related functionality. If, however, the parking detector 235 determines that the signal strength is low, the parking detector 235 determines (Step 416) whether there is evidence of the navigation apparatus 200 having entered the parking garage. In this example, the signal strength has remained low over a period of time indicative of the vehicle being parked in the parking garage, for example between when the navigation apparatus 200 comes to rest and when the navigation apparatus 200 began to move again, i.e. departs the parking space. In another embodiment, departure from the parking space can be assumed to be approximated by an act of powering up the navigation apparatus 200 where it is undesirable to analyse speed data.

If the first predetermined event and corroborating evidence have not been identified, then the parking detector 235 takes no further action and the GPS receiver 238 is permitted to use the almanac data followed by the cold start search (Step 416). In this regard, provision is being made for the use of the almanac data as the navigation apparatus 200 might not, in some circumstances, be located in the parking garage.

The parking detector 235 then attempts to determine (Step 418) whether the navigation apparatus 200 has been used in relation to a parked vehicle in the parking garage. In this respect, if the signal strength of the satellite broadcast signals received in respect of the satellites used to calculate a location fix, are sufficiently high to receive error-free location determination data then the parking detector 235 takes no further action and the GPS receiver 238 is again permitted to use the almanac data followed by a cold start search (Step 416) if use of the almanac data is unsuccessful. Alternatively, if the signal strength is low, the parking detector 235 tries to confirm that the navigation apparatus 235 has been used in relation to a parked vehicle by seeking the second corroborating evidence.

Figure 14:
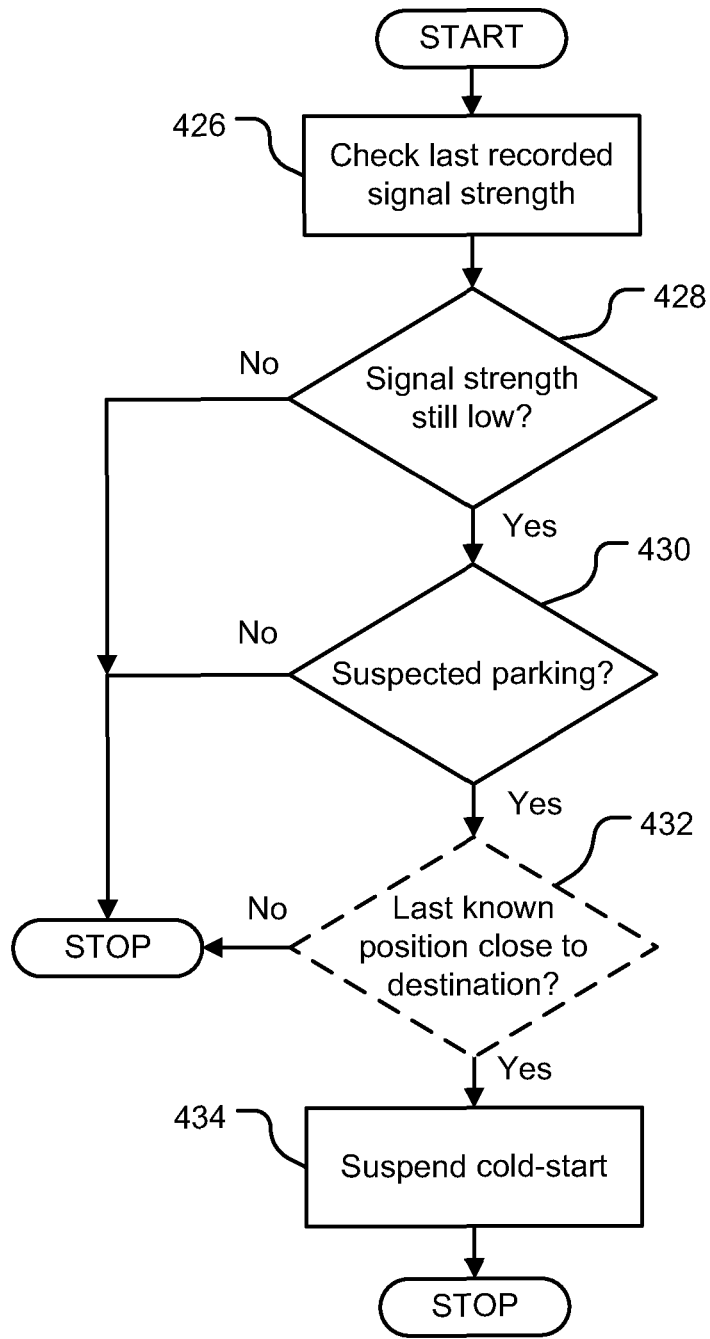

In this respect, and referring to FIG. 14, the parking detector 235 can determine that the signal strengths have been low both shortly before the navigation apparatus 200 came to rest and when the navigation apparatus 200 moved from rest or was powered-up (Steps 426 and 428), the continued low signal strength constituting the second corroborating event. Otherwise, the parking detector 235 takes no further action and the GPS receiver 238 is again permitted to use the almanac data followed by the cold start search (Step 416). Also, the second corroborating event can additionally or alternatively be the parking flag having been set after the navigation apparatus 200 reached the state of rest within the predetermined time period following entering the parking garage as described above (Step 430). However, if the parking flag has not been set, the parking detector 235 takes no further action and the GPS receiver 238 is again permitted to use almanac data followed by a cold start search (Step 416). Additionally or alternatively, the parking detector 235 can access last known location data for the navigation apparatus 200 and determine (Step 432) whether the last known position of the navigation apparatus 200 is within a predetermined distance, for example within 500 m, of a last known destination set.

This corroborating evidence is particularly applicable, where the user has set a destination and then has used a parking garage nearby the destination. Otherwise, the parking detector 235, optionally, takes no further action and the GPS receiver 238 is again permitted to use the almanac data followed by a cold start search (Step 416).

Although not shown in FIG. 14, the second corroborating event can be additionally or alternatively be that the last known destination can be within a predetermined distance of a parking garage, for example within 500 m. In this regard, the parking detector 235 can search the POI database in order to identify any parking garages within the predetermined distance of the last known location. Similarly, the last known position can be within a predetermined distance, for example within 500 m, of the last known destination, the last known destination being the parking garage. To this end, the parking detector 235 can search the POI database for a parking garage corresponding to the last known destination in order to make this assessment. Such a proximity determination can also constitute the second corroborating event.

In order to conclusively confirm whether the navigation apparatus 200 has been used in relation to a vehicle that has been parked, the parking detector 235 can, in another embodiment, be arranged to initiate a request, issued via the user interface, to the user to respond by indicating whether the vehicle has been parked, for example by answering a Yes/No question, for example: "Are you currently in a parking garage?", or "Are you inside a building or other enclosed structure?".

In the event that the parking detector 235 has determined that the vehicle has been parked in a parking garage, the parking detector 235 instructs (Step 434) the GPS receiver 238 to suspend use of the cold-start search for satellite signals.

Figure 15:
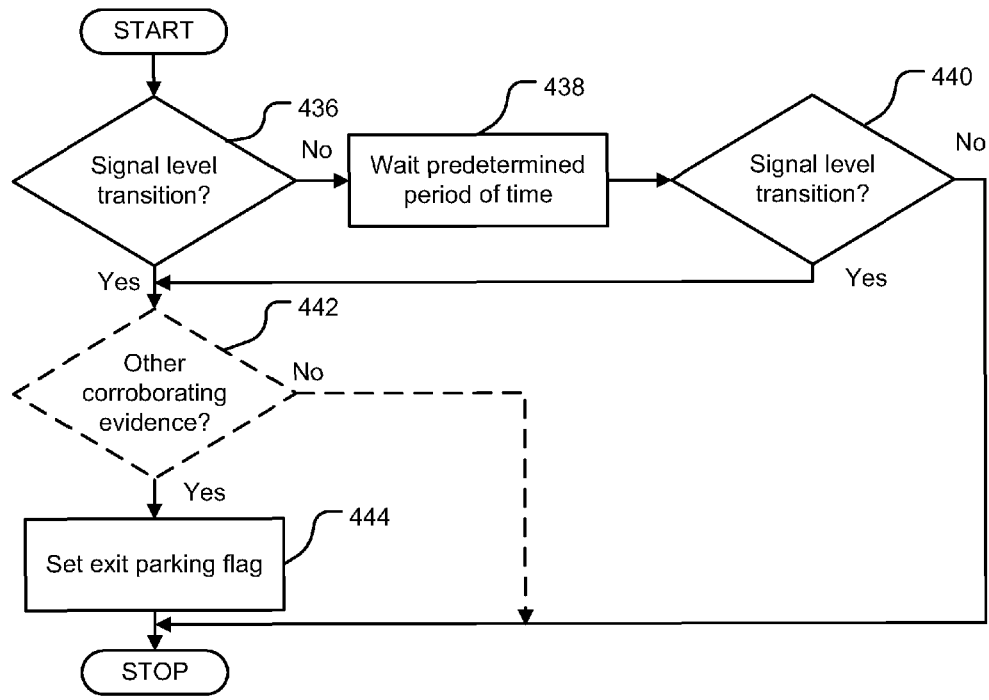
FIGS. 12 to 15 are flow diagrams of other parts of a method of acquiring a satellite signal constituting an embodiment of the invention.

Thereafter (FIG. 13), the parking detector 235 attempts to determine (Step 422) when the navigation apparatus 200 is exiting or has exited the parking garage. Referring to FIG. 15, following the determination that the vehicle has been parked, the parking detector 235, after a predetermined period of time, for example, 2 minutes, analyses (Step 436) the signal strengths of the satellite broadcast signals used to calculate the last known location. If the signal strength of a predetermined number of the satellite signals used, for example at least two, have increased to an acceptable level where error-free location-related data can be received or, after a predetermined further period of time, for example 1 minute, the signal strength has increased to an acceptable level where error-free location-related data can be received (Steps 438 and 440), the third predetermined event is deemed to have occurred and the parking detector 235 optionally seeks (Step 442) the third corroborating event.

In this example, the third corroborating event can comprise the signal strength of the telecommunications signal mentioned above received by the communications module 228 raising to or above a predetermined acceptable signal strength level. Another possible additional or alternative third corroborating event is an ambient light level change. In this regard, the light level measurement unit of the navigation apparatus 200 can measure the ambient light level again and the parking detector 235 can acquire the measured light level information and determine whether, depending upon the time, the measured light level has risen by at least a predetermined light level change value substantially associated with "daylight". Similarly, depending upon the time, for example at night, the change can be a decrease in the light level and the parking detector 235 can acquire the measured light level information and determine whether the measured light level has fallen by at least a predetermined light level change value substantially associated with "night". Additionally, or alternatively, the third corroborating event can be detection of another change in speed. In this respect, the parking detector 235 acquires the current calculated speed and determine if the current speed has fallen from an initial higher speed to or below the first (or other) predetermined speed, for example less than 10 kph. The parking detector 235 can also continue to monitor the calculated speed in order to determined whether the calculated speed subsequently increases to or above the second predetermined threshold speed, for example above 35 kph.

In another embodiment, the third corroborating event can additionally or alternatively be the detection of a last known position of the navigation apparatus 200 being within a building, for example the parking garage. Again the POI database can be used by the parking detector 235 to make this determination.

If the third corroborating event is also detected by the parking detector 235, the detection of the third predetermined event and the third corroborating event constitutes evidence of the navigation apparatus 200 having exited the parking garage, because RF signal strengths penetrate the structure of the parking garage with difficulty and so a signal strength rise results upon exit. The third predetermined event is corroborated by the increase or decrease in the ambient light level and/or travel speed change indicative of exiting the parking garage.

Referring back to FIG. 13, the detection (Step 422) that the navigation apparatus 200 has exited the parking garage results in the parking detector 235 clearing the parked flag mentioned above and instructing the GPS receiver 238 to initiate (Step 424) a search for available or visible GPS satellites using the almanac data stored. If the GPS receiver 238 is in the process of performing the cold-start search, the cold-start search is cancelled in favour of attempting to acquire the satellite broadcast signals using the almanac data. Now that the navigation apparatus 200 is no longer enclosed in the parking garage and the almanac data has not been prematurely disregarded and/or discarded, the GPS receiver 238 uses the almanac data to assist in acquiring satellite broadcast signals and hence providing a new location fix. In this regard, the almanac data is used to acquire a satellite signal following an immediately preceding failed attempt within a predetermined period of time to acquire the satellite signal using the almanac data. The resulting acquisition of satellite broadcast data and the provision of the new location fix is faster than if the cold-start search for GPS satellite signals were to be performed by default due to prolonged poor received signal strength in respect of the satellite broadcast signals.

Hence, it can be seen that the GPS receiver 238 is arranged to acquire a satellite signal using predicted orbit data of the almanac data in response to the self-mobility behaviour comprising the predetermined event sequence mentioned above. Furthermore, the cold-start search, a satellite signal acquisition procedure, can be suspended in response to the self-mobility behaviour detected comprising the predetermined event sequence.

In another embodiment, if the user is asked to indicate whether the navigation apparatus 200 is located in the parking garage, the route planning functionality of the navigation apparatus 200 can use this information in order to provide the user with in-park guidance in order to identify a start location as opposed to a current location within the parking garage, for example, "Proceed to the Park Lane exit", for example: "Have you just left a parking garage?" or "Have you just left a building or other enclosed structure?".

In a further embodiment, if the parking detector 235 detects that the navigation apparatus 200 has exited the parking garage, the parking detector 235 can initiate a request, via the user interface, for the user to confirm that the parking garage has been exited.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, the above embodiments have been described in the context of the navigation apparatus 200 being in a mode of operation that provides navigation assistance to the user. However, the above embodiments can apply to scenarios when the navigation apparatus 200 is simply being used in relation to "free driving" as mentioned previously.

As a further example, whilst embodiments described in the foregoing detailed description refer to GPS and the GPS receiver 238, it should be noted that the navigation apparatus may utilise any kind of position sensing technology as an alternative to (or indeed in addition to) the GPS. For example the navigation apparatus may utilise other global navigation satellite systems (GNSS), such as the proposed European Galileo system when available. Equally, it is not limited to satellite based but could readily function using ground based beacons or any other kind of system that enables the device to determine its geographic location, for example the long range navigation (LORAN)-C system.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A satellite signal acquisition apparatus comprising:
   a parking detector arranged to: analyse, when in use, self-mobility behaviour for monitoring mobility of a vehicle; detect a first mobility behaviour associated with parking in a building, wherein the detection of the first mobility behaviour comprises detecting a first predetermined event and a first predetermined corroborating event; and detect a second mobility behaviour associated with exiting the building subsequent to the first mobility behaviour; and
   a global navigation satellite system receiver operably coupled to the parking detector and arranged to acquire a satellite signal using predicted satellite orbit data in response to the detected first and second self-mobility behaviours;
   the apparatus further comprising at least one of:
   a light level measurement unit arranged to measure an ambient light level, wherein the first predetermined event comprises a change in the ambient light level by an amount equal to or greater than a predetermined value; and
   a speed calculator arranged to measure a speed, wherein the first predetermined corroborating event comprises a reduction in the speed to or below a predetermined speed.

2. The apparatus as claimed in claim 1, wherein the global navigation satellite system receiver is arranged to suspend execution of a satellite signal acquisition procedure in response to the detected first and second self-mobility behaviours comprising a predetermined event sequence.

3. The apparatus as claimed in claim 1, wherein the global navigation satellite system receiver is arranged to use the predicted satellite orbit data to acquire the satellite signal following an immediately preceding failed attempt within a preceding predetermined period of time to acquire the satellite signal using the predicted satellite orbit data.

4. The apparatus as claimed in claim 1, wherein the first mobility behaviour followed by the second mobility behaviour constitutes the predetermined event sequence.

5. The apparatus as claimed in claim 1, wherein detection of the first mobility behaviour comprises detecting the first predetermined event followed by a second predetermined event.

6. The apparatus as claimed in claim 5, wherein the first predetermined event corresponds to entering a building.

7. The apparatus as claimed in claim 5, wherein the first predetermined event is a transition of a signal strength of a satellite broadcast signal by an amount equal to or greater than a predetermined signal strength change value.

8. The apparatus as claimed in claim 7, wherein the second predetermined event is the signal strength of the satellite broadcast signal being at or below a predetermined unacceptable signal strength level when departure from a parking space is detected.

9. The apparatus as claimed in claim 5, further comprising:
   a bi-directional communications module arranged to receive, when in use, a communications signal; wherein the first predetermined corroborating event comprises a reduction of a signal strength of the communications signal by an amount equal to or greater than a predetermined communications signal strength change value.

10. The apparatus as claimed in claim 5, wherein detection of the second mobility behaviour associated with exiting the building comprises detection of a third predetermined event, the third predetermined event being a transition of a signal strength of a satellite broadcast signal from an unacceptable signal strength level to an acceptable signal strength level.

11. The apparatus as claimed in claim 10, wherein detection of the second mobility behaviour comprises detecting the third predetermined event and a third predetermined corroborating event.

12. The apparatus as claimed in claim 11, further comprising:
a bi-directional communications module arranged to receive, when in use, a telecommunications signal; wherein
the third predetermined corroborating event comprises an increase in a signal strength of the communications signal to or above a predetermined acceptable communications signal strength level.

13. The apparatus as claimed in claim 11, wherein the third predetermined corroborating event comprises a last known position being within a building.

14. A method of acquiring a satellite signal, the method comprising:
analysing self-mobility behaviour of a navigation apparatus for monitoring mobility of a vehicle;
detecting first mobility behaviour associated with parking in a building, wherein the detection of the first mobility behaviour comprises detecting a first predetermined event and a first predetermined corroborating event;
detecting a second mobility behaviour associated with exiting the building subsequent to the first mobility behaviour; and
acquiring by a global navigation satellite system receiver a satellite signal using predicted satellite orbit data in response to the self-mobility behaviour comprising a predetermined event sequence;
wherein the method further comprises at least one of:
measuring an ambient light level, by a light level measurement unit, wherein the first determined event comprises a change in the ambient light level by an amount equal to or greater that a predetermined value; and
measuring a speed, by a speed calculator, wherein the first predetermined corroborating event comprises a reduction in the speed to or below a predetermined speed.

15. A non-transitory computer-readable medium containing computer instructions stored therein for causing a computer processor to execute a method of acquiring a satellite signal, the method comprising:
analysing self-mobility behaviour of a navigation apparatus for monitoring mobility of a vehicle;
detecting first mobility behaviour associated with parking in a building, wherein the detection of the first mobility behaviour comprises detecting a first predetermined event and a first predetermined corroborating event;
detecting a second mobility behaviour associated with exiting the building subsequent to the first mobility behaviour; and
acquiring by a global navigation satellite system receiver a satellite signal using predicted satellite orbit data in response to the self-mobility behaviour comprising a predetermined event sequence;
wherein the method further comprises at least one of:
measuring an ambient light level, by a light level measurement unit, wherein the first determined event comprises a change in the ambient light level by an amount equal to or greater that a predetermined value; and
measuring a speed, by a speed calculator, wherein the first predetermined corroborating event comprises a reduction in the speed to or below a predetermined speed.

\* \* \* \* \*